United States Patent [19]

Honaker

[11] 4,117,886
[45] Oct. 3, 1978

[54] OIL SHALE RETORTING AND OFF-GAS PURIFICATION

[75] Inventor: Donald E. Honaker, Naperville, Ill.

[73] Assignee: Standard Oil Company (Indiana), Chicago, Ill.

[21] Appl. No.: 834,570

[22] Filed: Sep. 19, 1977

[51] Int. Cl.$^2$ ............... B01D 53/34; E21B 43/00; E21B 43/24
[52] U.S. Cl. ............... 166/259; 166/261; 166/267; 208/11 R; 299/2; 423/220
[58] Field of Search ............... 166/256, 259, 261, 267, 166/265, 266, 272; 299/2, 4, 5; 423/220, 210, 225, 232, 242, 244; 208/11 R

[56] References Cited

U.S. PATENT DOCUMENTS

| | | | |
|---|---|---|---|
| 1,520,726 | 12/1924 | Shaw | 423/232 |
| 2,368,600 | 1/1945 | Rosenstein | 423/220 |
| 2,671,008 | 3/1954 | Gollmar | 423/232 |
| 2,695,836 | 11/1954 | Gilmore | 423/220 |
| 3,661,423 | 5/1972 | Garrett | 299/2 |
| 3,957,674 | 5/1976 | Sano et al. | 423/225 X |
| 3,994,343 | 11/1976 | Cha et al. | 166/259 |
| 4,014,575 | 3/1977 | French et al. | 299/2 |
| 4,016,239 | 4/1977 | Fenton | 208/11 X |
| 4,046,856 | 9/1977 | Itoo et al. | 423/242 X |

Primary Examiner—Stephen J. Novosad
Attorney, Agent, or Firm—Frank J. Sroka; Arthur G. Gilkes; William T. McClain

[57] ABSTRACT

Disclosed is a process for removing acidic impurities from off-gases generated in the retorting of oil shale comprising contacting a rubblized mass of oil shale which has been substantially depleted in hydrocarbonaceous materials with water, so as to extract basic components from the mass; and contacting off-gases, which were generated during the retorting of oil shale and which contain acidic impurities, with the water containing basic components so as to substantially remove said acidic impurities from said off-gases. Also disclosed is a process for the in situ retorting of oil shale and removal of acidic impurities from off-gases generated in the in situ or surface retorting of oil shale comprising forming a plurality of subterranean in situ oil shale retorts containing rubblized oil shale having a void space of about 5 to about 40 per cent; retorting a first subterranean in situ retort until the rubblized oil shale is spent and substantially depleted in hydrocarbonaceous material; injecting water into the spent retort so as to deplete the heat content of the retorted rubblized oil shale and to form steam; recovering and using said steam in the retorting of a second subterranean in situ oil shale retort; continuing to inject water into the spent first retort so as to extract basic components from the retorted rubblized oil shale; recovering said water containing basic components; and contacting off-gases generated during the in situ or surface retorting of oil shale, said off-gases containing acidic impurities, with said water containing basic components so as to substantially remove said acidic impurities from said off-gases.

4 Claims, 1 Drawing Figure

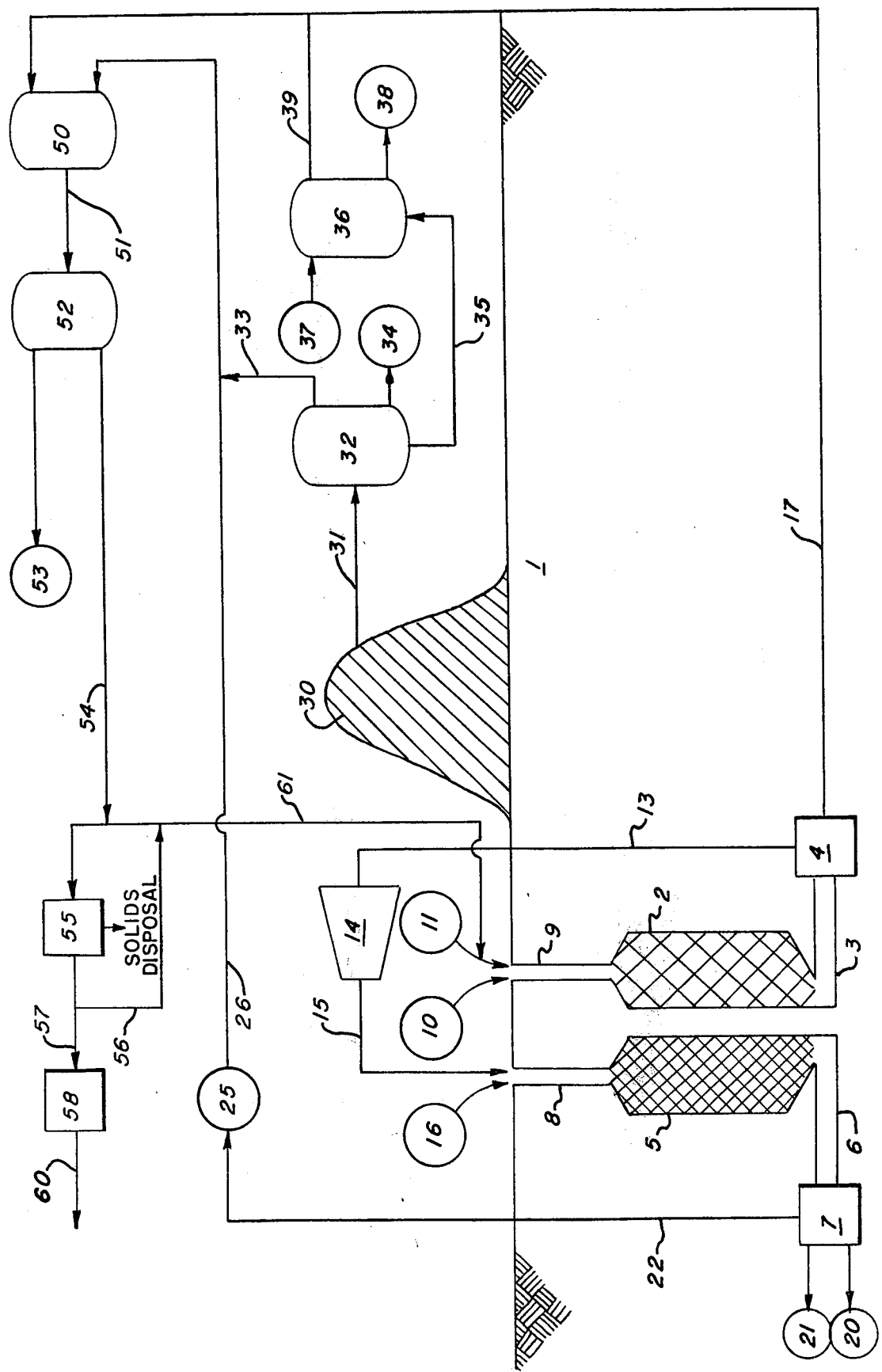

OIL SHALE RETORTING AND OFF-GAS PURIFICATION

BACKGROUND

This invention relates to the retorting of oil shale and the purification of off-gases from oil-shale retorting.

The term oil shale refers to sedimentary deposits containing organic materials which can be converted to oil shale. Oil shale contains an organic material called kerogen which is a solid carbonaceous material from which shale oil can be retorted. Upon heating oil shale to a sufficient temperature, kerogen is decomposed and a liquid product is formed.

Oil shale can be found in various places throughout the world, especially in the United States in Colorado, Utah and Wyoming. Some especially important deposits can be found in the Green River formation in Piceance Basin, Garfield and Rio Blanco counties, and northwestern Colorado.

Oil shale can be retorted to form a hydrocarbon liquid either by in situ or surface retorting. In surface retorting, oil shale is mined from the ground, brought to the surface, and placed in vessels where it is contacted with hot retorting gases. The hot retorting gases cause shale oil to be freed from the rock. Spent retorted oil shale which has been depleted in kerogen is removed from the reactor and discarded. Some well known methods of surface retorting are in Tosco, Lurgi, and Paraho processes.

In the Tosco proces ceramic balls heated by combustion of retort off-gas, contact shale in a horizontal rotary kiln. Kerogen is broken down and emanates from the kiln as gases which are fractionated to yield liquid products plus off-gas which is in turn combusted to heat the ceramic balls. Spent shale is separated from the ceramic balls by screening, cooled and sent to disposal. The ceramic balls are recycled to a heater.

In the Lurgi process carbon on spent shale is combusted in a riser heater. The hot spent shale is separated from combustion products and mixed with fresh shale feed in a sealed screw conveyor. Gases from this contact are fractionated to yield liquid products and combustible offgas for use.

In the Paraho process fresh shale is fed to the top of a vertical shaft kiln, contacted with hot gases produced by either in situ combustion of coke on spent shale or externally heated recycle gas. Kerogen breakdown products are withdrawn from the kiln by vapor-collecting tubes near the top of the kiln. Spent shale is removed from the bottom of the kiln by a grate system. Vapors leaving the kiln are separated to yield oil product and combustible gas for use.

Another method of retorting oil shale is the in situ process. In situ retorting of oil shale generally comprises forming a retort or retorting area underground, preferably within the oil shale zone. The retorting zone is formed by mining an access tunnel to or near the retorting zone and then removing a portion of the oil shale deposit by conventional mining techniques. About 5 to about 40 percent, preferably about 15 to about 25 percent, of the oil shale in the retorting area is removed to provide void space in the retorting area. The oil shale in the retorting area is then rubblized by well-known mining techniques to provide a retort containing rubblized shale for retorting.

A common method for forming the underground retort is to undercut the deposit to be retorted and remove a portion of the deposit to provide void space. Explosives are then placed in the overlying or surrounding oil shale. These explosives are used to rubblize the shale, preferably forming an area of rubble having uniform particle size. Some of the techniques used for forming the undercut area and the rubblized area are room and pillar mining, sublevel caving, and the like. After the underground retort is formed, the pile of rubblized shale is subjected to retorting. Hot retorting gases are passed through the rubblized shale to effectively form and remove liquid hydrocarbon from the oil shale. This is commonly done by passing a retorting gas such as air or air mixed with steam and/or hydrocarbons through the deposit. Most commonly, air is pumped into one end of the retort and a fire or flame front initiated. This flame is then passed slowly through the rubblized deposit to affect the retorting. Not only is shale oil effectively produced, but also a mixture of off-gases from the retorting is also formed. These gases contain hydrogen, carbon monoxide, ammonia, carbon dioxide, hydrogen sulfide, carbonyl sulfide, oxides of sulfur and nitrogen, and low molecular weight hydrocarbons. Generally a mixture of off-gases, water and shale oil are recovered from the retort. This mixture undergoes preliminary separation commonly by gravity to separate the gases from the liquid oil from the liquid water. The off-gases commonly also contain entrained dust and hydrocarbons, some of which are liquid or liquefiable under moderate pressure. The off-gases commonly have a very low heat content, generally less than about 100 to about 150 BTU per cubic foot.

Because underground retorts are generally quite large in size and large quantities of air or oxygen containing gases are needed to support combustion, large amounts of off-gases are formed during retorting. Because these off-gases contain both impurities and also recoverable energy, it is highly desirable to find an effective method of treating these gases and also recovering energy in useable form. It is also quite important that these off-gases are treated in such manner as to be compatible with the environment.

A number of patents describe methods of in situ retorting of oil shale. Karrick, L. C., U.S. Pat. No. 1,913,395, is directed to the in situ gasification of underground carbonaceous materials, such as oil shale. After an excess tunnel from the surface is formed, about 10 to 40 percent of the gasification zone is mined out in order to provide voids in the deposits and to provide various tunnels. Long drill holes are made in the roof, walls and floor of certain tunnels to be filled with explosives which will form a rubble suitable for burning or gasification. The proper spacing of the blast holes including their depth, size of powder charge and order of firing are considered important. It is thought that this technique will break the deposit sufficiently to form loose masses of uniform permeability. It is preferred to use a steeply sloping or vertical combustion chamber when working deposits such as oil shale from Colorado. Downflow of oxygen as a combustion gas is shown.

Karrick, S. M., U.S. Pat. No. 1,919,636, teaches the in situ recovery of oil shale in large vertical chambers or tunnels which are substantially full of broken shale. Hot retorting gases are passed either downwardly or upwardly through the chambers. The vertical retorting areas can be formed by mining small sloping branch raises or slots. The walls of these raises are drilled and blasted from bottom to top, filling the chamber with broken material. Oil shale is removed to provide a porosity of 25 to 40 percent. Retorting is conducted with downflow of retorting gases such as air and combustible gas. Another technique for rubblizing oil shale is described in conjunction with FIG. 10. A number of development tunnels are drilled at the base of the oil shale deposit to provide a work area and void space. Next holes are drilled into the roof of the tunnel, filled with explosives and detonated to break the roof in large blocks averaging 2—3 feet in minimum diameter. Another round of holes are drilled and fired, each round bringing the pile of broken shale nearer to the roof. In this case the retort is horizontal. Retorted shale oil collects initially at the bottom of the retort.

Uren, U.S. Pat. No. 2,481,051, is directed to a method of in situ distillation of carbonaceous materials such as oil shale. An access tunnel down into the deposit is mined from which mine drifts and raises are driven under, over and through the deposit selected for treatment. The mined oil shale is removed. Commonly, the mine drifts are separated vertically by about 150 feet of oil shale. Various methods of stoping may be employed such as shrinkage stoping or block caving. Shrinkage stoping is recommended. In this method the rock is excavated progressively upward from one level to the next, the miners drilling and blasting away the overhead "back". The miners stand and set up their equipment upon the rock previously broken, just enough of the broken material being drawn through chutes into drifts below to leave suitable head room between the back and the top of the broken rock. In this method of stoping, approximately $\frac{1}{3}$ of the rock may be withdrawn and $\frac{2}{3}$ remains in the stope. Retort combustion is generally conducted in a downward direction by the initial injection of air and combustible fuel or gas and subsequently by either air injection alone or in conjunction with fuel. Shale oil is recovered at the bottom of the retort.

Van Poollen, U.S. Pat. No. 3,001,776, is directed to the in situ retorting of oil shale and teaches that the retorts can be formed by well-known mining practices which may include sublevel stoping, shrinkage stopes, sublevel caving or block caving. An access shaft is mined with various drifts so that the retorting area can be worked at a plurality of levels. The overlaying oil shale above a stope is fractured, generally by explosives detonated in blast holes in the overhead deposit. Some of the oil shale is removed to achieve the desired porosity. The retort filled with rubble can be retorted in either the upflow or downflow direction by the injection of air. Ignition can be accomplished by any suitable method such as oxygen used in conjunction with natural gas.

Ellington, U.S. Pat. No. 3,586,377, is directed to a method of in situ recovery of shale oil. The method of obtaining shale oil from a zone of unmined oil shale comprises establishing access means at least two points in said zone, establishing communication between these access means through the zone, fragmenting at least part of the oil shale in the zone in the area of the communication to produce a porous mass of fragmented oil shale, supplying heating means to said fragmented oil shale through one of said access points to pyrolyze shale oil in the oil shale and collecting said shale oil through the other of said access means.

Prats, U.S. Pat. No. 3,434,757, is directed to a method of in situ recovery of shale oil wherein the rubblized oil shale is created by forming at least two tunnels, exploding the archways between the tunnels and thereby creating a large roof which collapses. Another series of explosives extending radially upward and substantially parallel to the tunnels is detonated to rubblize the overlaying oil shale. Hot fluid is then circulated through the permeable mass of oil shale to release the shale oil.

Garrett, U.S. Pat. No. 3,661,423, is directed to the recovery of carbonaceous values by in situ retorting of rubblized deposits such as oil shale. A limited undercut is made over a large area leaving an overlaying deposit supported by a multiplicity of pillars. The pillars are then removed and the overlaying deposit expanded to fill the void with particles of uniform size, porosity and permeability. Communication is then established with the upper level of the expanded deposit and a high temperature gaseous media which will liquefy or vaporize the carbonaceous values is introduced in a manner which causes the released values to flow downward for collection at the base of the expanded deposit. Convenient media are hot flue gases created by igniting the upper level of the expanded carbonaceous deposit forcing a flow of hot gases downward through the expanded deposit.

Ridley, U.S. Pat. No. 3,951,456, discloses an in situ process for recovering carbonaceous values from a subterranean deposit comprising the steps of (a) developing an in situ rubble pile within a retorting chamber of a subterranean carbonaceous deposit having a retorting fluid entrance and retorting fluid exit, said rubble pile being formed by undercutting at about the base of the carbonaceous deposit to remove a predetermined volume of material and form a sloped floor having a high point at the shortest retorting fluid path between the retorting fluid entrance and the floor and the low point at the periphery of the floor and expanding the deposit to form the in situ rubble pile wherein the bulk permeability of the rubble pile increases from the shortest retorting fluid path to the longest retorting fluid path between the retorting fluid entrance and the retorting fluid exit so that the resistance to retorting fluid flow through the rubble pile along all retorting fluid paths is approximately equal; (b) establishing the retorting fluid entrance between the rubble pile and a source of retorting fluid; (c) establishing the retorting fluid exit between the rubble pile and destination for the retorting fluid, the exist communication with the rubble pile being spaced by at least a portion of the rubble pile from the retorting fluid entrance; (d) retorting the rubble pile to extract the carbonaceous values therefrom, the retorting step including the passage of the retorting fluid through the rubble pile along the retorting fluid paths; and (e) recovering the restorted carbonaceous values.

When oil shale is retorted, it is expected that mineral structure is converted into oxides of calcium or magnesium, alkali carbonates, or mixtures thereof. When such oxides are contacted with water, these oxides can become suspended as small particles or form soluble or suspended hydroxides. These oxides and hydroxides are basic.

In both surface and in situ retorting methods, off-gases are formed which can contain acidic components such as $H_2S$, $SO_2$, $SO_3$, $CO_2$, an COS. Some of these acidic components are undesirable from an environmental viewpoint, and their discharge to the atmosphere is desirably limited. Some of these acidic components can form environmentally undesirable products when combusted, as for example when off-gases are burned for power generation to recovery energy from low BTU off-gases. Some of the acid components are corrosive and have deleterious effects on equipment, such as the equipment used in energy recovery from low BTU off-gases.

It is an object of this invention to economically remove acidic impurities in the off-gases formed during oil shale retorting or during combustion of off-gases.

It is an object of this invention to provide a method of recovering waste heat from spent in situ oil shale retorts.

It is an object of this invention to provide an improved method of oil shale retorting.

It is an object of this invention to provide an economical integrated process for oil shale retorting and off-gas clean up.

SUMMARY OF THE INVENTION

This invention relates to the retorting of oil shale and the purification of off-gases from oil shale retorting, including combustion products of off-gases from oil shale retorting.

A process for removing acidic impurities from off-gases generated in the retorting of oil shale or in the combustion of off-gases comprises contacting a rubblized mass of oil shale which has been substantially depleted in hydrocarbonaceous materials with water, so as to extract basic components from the mass; and contacting off-gases, which were generated during the retorting of oil shale and which contain acidic impurities, with the water containing basic components so as to substantially remove said acidic impurities from said off-gases. The oil shale which is substantially depleted in hydrocarbonaceous materials may be spent shale from surface or in situ retorting. For example, spent shale which is removed from Tosco, Lurgi or Paraho retorts may be contacted with water in a reactor or an extraction zone for a time sufficient to extract basic components from the spent shale. The water containing basic component is then used to remove impurities from off-gases generated during the surface or in situ retorting of oil shale.

Spent shale in an in situ retort can also be contacted with water to extract basic components for use in the purification of off-gases. Commonly, spent in situ retorts hold large quantities of heat which will dissipate very slowly. If water is introduced into such a hot retort, the water will be vaporized to steam with little removal of basic components. However, steam can be extremely useful in the retorting of oil shale. For example, steam can be injected along with air in the in situ retorting of oil shale in order to control retorting conditions and maximize energy recovery. Some of the benefits from steam injection are control and moderation of combustion temperature in place of hard to separate inert recycle gas; increased energy recovery by promoting gasification of coke on spent shale and higher oil yield by decreasing oil thermal degradation and combustion losses. Therefore, if water is introduced into a hot spent in situ retort and steam is formed, the steam can be used in the retorting of nearby in situ retorts. After enough heat is extracted from the spent retort so that liquid water can exist in the retort or be removed from the retort, extraction or removal of basic components can be carried out. Water can be injected, and circulated if necessary to suspend or dissolve basic components such as the oxides or hydroxides of calcium or magnesium, alkali carbonates, or mixtures thereof.

Therefore, a process for the in situ retorting of oil shale and removal of acidic impurities from off-gases generated in the in situ or surface retorting of oil shale or in the combustion of off-gases can comprise forming a plurality of subterranean in situ oil shale retorts containing rubblized oil shale having a void space of about 5 to about 40 percent; retorting a first subterranean in situ retort until the rubblized oil shale is spent and substantially depleted in hydrocarbonaceous material; injecting water into the spent retort so as to deplete the heat content of the retorted rubblized oil shale and to form steam; recovering and using said steam in the retorting of a second subterranean in situ oil shale retort; continuing to inject water into the spent first retort so as to extract basic components from the retorted rubblized oil shale; recovering said water containing basic components; and contacting off-gases generated during the in situ or surface retorting of oil shale, said off-gases containing acidic impurities, with said water containing basic components so as to substantially remove said acidic impurities from said off-gases.

Off-gases containing acidic impurities from either surface or in situ retorting can be contacted with water containing basic components for a sufficient time so as to purify the off-gases to the desired level. Naturally the amount of contacting, temperature of contacting, and time of contacting will be determined by the amount of acidic impurities, amount and strength of the aqueous solution of basic components, and desired level of purification. Generaly the contacting of off-gases and water containing basic components is conducted for a time sufficient to achieve a substantial removal of acidic components.

A convenient method of contacting off-gases with water containing basic components and separating the resulting mixture is use of venturitype scrubbers alone or in combination with cyclonic spray separating chambers. Any of well known gas-liquid contacting devices such as packed beds, baffle columns, spray chambers could be used. Selection will in part be guided by economics, desirability of simultaneous dust removal, solids loading, operability and desired level of acid gas removal. Other contact methods could be used, for example underground chambers, tunnels and gas passages suitably equipped with pipes and devices to convey water containing basic components into intimate contact with off-gases, and collect resultant liquid mixtures for reuse. In general, gas-liquid contacting will be in the range of 60° F. to 150° F. The preferred arrangement of gas-liquid contacting will of course depend on corrosion, pressure drop, scaling, and logistic economics. The contacting can be done in one stage or a plurality of stages.

When off-gases are contacted with water containing basic components, compounds such as sulfates and sulfites of calcium and magnesium are formed. While the sulfates and sulfites of magnesium are commonly soluble under commonly encountered conditions, sulfates and sulfites of calcium are commonly not soluble. Therefore, when off-gases containing acidic impurities are contacted with water containing basic components and the purified or partly purified off-gases are separated from the water, and aqueous phase is segregated containing both soluble and insoluble compounds.

The aqueous phase can be returned to the spent retort where some solid precipitates will be generated and remain in place. Through this, a portion of the basic components will be regenerated for reuse, for example, the removal of $SO_2$ from off-gas by caustic sodium sulfite/bisulfite. This solution is contact with calcium oxide or hydroxide would precipitate calcium sulfite and regenerate causticity.

A portion or purge stream of the circulating aqueous phase can be sent to a settler or clarifier, where solid materials would be removed for disposal. Soluble solids in this purge stream could be treated in well known treatment equipment to control such items as oxygen demand, or recover valuable material and sent to disposal. Convenient disposal of soluble streams can be by outlet to appropriate above ground waters, solar evaporation ponds or cement-like stabilization in previously extracted retorts. Insoluble solids could be disposed by slurry backfilling of sealed previously extracted retorts. In some cases, the alkaline materials can be at least partially extracted from the aqueous stream by contact with the rubblized mass in a previously extracted retort. Environmental constraints would naturally be observed and appropriate precautions taken.

THE DRAWING

The attached drawing is a schematic diagram of an oil shale retorting process with purificatin of off-gases.
In situ retorts 2 and 5 are located within oil shale deposit 1. These retorts can be formed by any well-known mining technique, preferably by sublevel caving. Rubblized oil shale within in situ retorts is retorted by passing a hot retorting gas through the rubblized mass so as to free shale oil from the deposit. The hot retorting gases are commonly formed by passing air, air plus steam, or air plus recycle off-gases through the rubblized mass in an in situ retort. A burner may be needed to initiate combustion. Air 10 can be passed through access way 9 into in situ retort 2 so that the rubblized mass oil shale within the retort is effectively retorted. Oil, water, and off-gases are then passed through collection area 3 to separation zone 4. After in situ retort 2 is substantially depleted in hydrocarbonaceous material, retorting is stopped. Water 11 is then passed through access way 9 into the hot rubblized mass within in situ retort 2. Because this hot mass of spent shale holds a great deal of heat and because the surrounding rock formation serves as an insulator, a great deal of heat is present to vaporize water added to the rubblized mass. Water is converted into steam and is passed through collection area 3 to separation zone 4. The steam is then passed through line 13 to compressor 14 where it is compressed for passage through line 15 for use in retorting other in situ retorts such as in situ retort 5. After in situ retort has cooled from the introduction of water, the water can exist as a liquid. Water then injected into the rubblized mass of oil shale or spent oil shale in in situ retort 2 will then suspend or extract basic materials from the retorted mineral. The water containing basic components is then removed by collection area 3 and passed to separation zone 4. The water containing basic components is then passed through line 17 for use in the purification of off-gases.

When forming in situ retorts, approximately 5 to 40 percent of oil shale is mined, removed from the formation and brought to the surface. This rubblized mass of oil shale 30 is then passed through line 31 to surface retort 32 where it is contacted with hot retorting gases to release shale oil. During this retorting off-gases are formed which are passed out of retort 32 through line 33, shale oil 34 is recovered, and spent retorted oil shale is removed through line 35. The spent retorted oil shale can be introduced into vessel 36 where it can be contacted with water 37 so that basic components can be extracted or suspended by the water and this water solution containing basic components can be passed out of reactor 36 through line 39 for use in off-gas scrubbing. Spent shale 38 which has been extracted or contacted with water is then passed out of reactor 36.

In situ retort 5 is a retort currently undergoing retorting. Air 16 and steam from line 15 is passed through access tunnel 8 into in situ retort 5 where a rubblized mass of oil shale is effectively retorted. Shale oil, water, and off-gases are then collected in zone 6 and passed to separation zone 7. Separation zone 7 is commonly a simple gravity separator which separates water from oil from gases. Water 20 is removed from separation zone 7. Oil shale 21 is also removed from separation zone 7. Off-gases are passed from zone 7 through line 22 for cleanup. In some cases these off-gases are first treated in zone 25 to remove dust, entrained oil, and others. The off-gases are then treated for purification.

In this process diagram, off-gases from surface retort 32 and line 33 are combined with off-gases from in situ retort 5 in line 26 for purification. The combined off-gas stream is passed into reactor 50 along with water containing extracted or suspended basic components. Water containing basic components from in situ retort 2 and line 17 are combined with water with extracted and suspended basic components from surface retorting from line 39 and passed into reactor 50. After sufficient contacting between off-gases and water containing basic components the achieve a satisfactory level of purification, the contents of reactor 50 are passed through line 51 through separation zone 52 where purified off-gases are separated from the aqueous phase. The off-gases are then passed out of reactor 52 to other processing 53. This other processing can be energy recovery through combustion and use of power turbines, use as diluent in retorting other in situ retorts, and other uses. The aqueous phase removed from reactor 52 is then passed via line 61 to the spent retort 2 for regeneration and recirculation. A purge stream is removed from the circulation loop to control suspended solids concentration and sent to a solid separator 55 wherein insoluble solids are recovered and used or disposed of. A clear aqueous phase is returned through line 56 to the circulation loop for regeneration. A soluble purge stream 57 is withdrawn at a rate to control the soluble salt concentration and sent to 58 for recovery and/or treatment before being passed through line 60 to disposal.

I claim:
1. A process for removing acidic impurities from off-gases generated in the retorting of oil shale in the combustion of off-gases comprising:
   contacting a rubblized mass of oil shale which has been substantially depleted in hydrocarbonaceous materials with water, so as to extract basic components from the mass; and
   contacting off-gases, which were generated during the retorting of oil shale and which contain acidic impurities, with the water containing basic components so as to substantially remove said acidic impurities from said off-gases.
2. A process for removing acidic impurities from off-gases generated in the in situ retorting of oil shale or in the combustion of off-gases comprising:
   contacting a rubblized mass of oil shale in an in situ retort with water, said mass being substantially depleted in hydrocarbonaceous materials, so as to extract basic components from the mass; and contacting off-gases, which were generated during the retorting of oil shale and which contain acidic impurities, with the water containing basic components so as to substantially remove said acidic impurities from said off-gases.

3. The process of claim 2 wherein the acidic impurities comprise $H_2S$, $SO_2$, $SO_3$, $CO_2$ or COS or mixtures thereof and the basic components comprise the oxides or hydroxides of calcium or magnesium, alkali carbonates, or mixtures thereof.

4. A process for the in situ retorting of oil shale and removal of acidic impurities from off-gases generated in the in situ or surface retorting of oil shale or in the combustion of off-gases comprising:

forming a plurality of subterranean in situ oil shale retorts containing rubblized oil shale having a void space of about 5 to about 40 percent;

retorting a first subterranean in situ retort until the rubblized oil shale is spent and substantially depleted in hydrocarbonaceous material;

injecting water into the spent retort so as to deplete the heat content of the retorted rubblized oil shale and to form steam;

recovering and using said steam in the retorting of a second subterranean in situ oil shale retort;

continuing to inject water into the spent first retort so as to extract basic components from the retorted rubblized oil shale;

recovering said water containing basic components; and contacting off-gases generated during the in situ or surface retorting of oil shale, said off-gases containing acidic impurities, with said water containing basic components so as to substantially remove said acidic impurities from said off-gases.

* * * * *

UNITED STATES PATENT OFFICE
CERTIFICATE OF CORRECTION

Patent No. 4,117,886　　　　　　　　　　　Dated October 3, 1978

Inventor(s) Donald E. Honaker

It is certified that error appears in the above-identified patent and that said Letters Patent are hereby corrected as shown below:

The Patent reads:　　　　　　　　　　and should read per Appl.　Our　PTO
　　　　　　　　　　　　　　　　　　　　　　　　　　　　　　　　　Error　Error

| Col. | Line | | Pg. | Line | |
|---|---|---|---|---|---|
| 1 | 29 | "in" | 2 | 18 | --the-- |
| 1 | 31 | "proces " | 2 | 20 | --process-- |
| 2 | 16 | "flame" | 4 | 5 | --flame front-- |
| 4 | 50 | "restorted" | 8 | 26 | --retorted-- |
| 6 | 34 | "venturitype" | 11 | 29 | --venturi- |
|   |    |              |    | 30 |   type |
| 7 | 6-7 | "known treatment" | 13 | 4 | --known waste treatment-- |
| 7 | 9 | "solubla streams" | 13 | 6 | --soluble solid streams-- |

Signed and Sealed this

Twenty-ninth Day of May 1979

[SEAL]

Attest:

RUTH C. MASON　　　　　　　　　　DONALD W. BANNER
*Attesting Officer*　　　　　　*Commissioner of Patents and Trademarks*